Patented Mar. 6, 1945

2,370,935

UNITED STATES PATENT OFFICE 2,370,935

WELDING FLUXES

Charles James Bushrod, Prestwich, Manchester, England, assignor to Magnesium Elektron Limited, London, England, a company of Great Britain No Drawing. Application April 26, 1943, Serial No. 484,601. In Great Britain April 20, 1942

3 Claims. (Cl. 148—26)

This invention relates to welding fluxes suitable for welding magnesium and magnesium base alloys. Welding of magnesium and its alloys has heretofore been accomplished with welding fluxes made in accordance with British Patents Nos. 313,487 and 339,923 and consisting of lithium and potassium chlorides and fluorides. These fluxes are very suitable for magnesium base alloys containing aluminium and zinc and a very low percentage of manganese e. g. Elektron (registered trade-mark) alloy AZM containing about 6% aluminium, 1% zinc, and 0.25% manganese. However when using this flux on alloys containing higher percentages of manganese (e. g. Elektron AM503 alloy containing about 1.5% manganese) there is a tendency for black particles to remain in the weld which on removal leave small pits in the weld metal. I have ascertained that these particles are rich in manganese. The aforesaid fluxes therefore although apparently capable of dissolving magnesium and aluminium oxides did not dissolve manganese oxides. With a view to overcoming this difficulty I have tested a very large number of possible flux compositions and as a result I have found that fluxes containing lithium, magnesium and potassium halides in certain percentages, would give clean welds with both kinds of alloy whilst being satisfactory fluxes in other respects e. g. with regard to low melting point and wetting power and reasonable cost. Moreover it is possible to produce fluxes from these halides without the use of sodium salts which give rise to the bright sodium flame which is objectionable to some welders. A small percentage of sodium salts can however be included where this bright flame is not considered objectionable.

Minor proportions of various other salts may also be included as will be described hereafter.

I will now further describe the results of my experiments with reference mainly to lithium chloride, magnesium chloride, potassium chloride, and potassium fluoride, although it will be understood that substances producing these compounds during welding are to be regarded as equivalents within the scope of the invention e. g. lithium fluoride and potassium chloride together can replace lithium chloride and potassium fluoride together (so that the flux may still contain the same amounts of lithium, potassium, fluorine, and chlorine).

I have tried fluxes having various percentages of lithium chloride and find that below 21% a film forms over the molten metal during welding giving difficulty to the welder and that the weld is not sufficiently clean. Whilst the fluxes may contain up to 58% lithium chloride such a high percentage is undesirable from the point of view of cost. A content of between 30 and 35% or between 25 and 40% lithium chloride is preferred.

A further difficulty was encountered with many flux compositions viz. the formation of small depressions or dimples on the back of the weld which occurs when the flux is applied to the back of the weld as a paste with water or with any other solvent containing hydroxyl groups (glycerine, alcohol, etc.). I find that this can be avoided by using over 14% (say 17.5 or 20%) potassium fluoride in a flux containing 30% lithium chloride. This lower limit of potassium fluoride varies somewhat with variation of lithium chloride content. There is also an upper limit for the potassium fluoride content above which the melting point of the flux is too high; this upper limit is about 25% potassium fluoride for a 30% lithium chloride content and rising to about 30% potassium fluoride for a flux containing 35% lithium chloride. Some variation of this range is permissible but the content of potassium fluoride in the flux of the present invention will always be within the range 14–40% or preferably 15–35%.

The lowest limit of magnesium chloride is 3% although best results are obtained with 10% or over and we prefer 10 to 15%. Higher percentages of magnesium chloride may be employed but the evolution of hydrochloric acid fumes during welding increases with the increasing amount of magnesium chloride and if over 25%, of this constituent is used, the fumes are sufficient to cause discomfort to the operator when the flux is used as an aqueous paste, and this, therefore, is regarded as the limit. Amounts over 25% also do not readily make a stable paste because formation of magnesium chloride hydrates occurs and this has a cementing action and the material tends to set solid. The magnesium chloride can be partly replaced without reducing the magnesium chloride below 3% by one or more chlorides of the alkaline earth metals calcium, barium, and strontium, but the welds tend to be less clean when welding metal containing the higher percentages of manganese, and magnesium chloride therefore is preferable. However, the replacement of a minor proportion of magnesium chloride by one of the other chlorides has the advantage of assisting the coating or wetting action of the flux and a proportion of 2–7% (e. g. 4.5%) of calcium chloride is satisfactory and may be used advantageously with 5–12% (e. g. 8%) magnesium chloride.

Potassium chloride is mainly added to modify the melting point of the flux but I have found that for a given mixture of lithium and magnesium chlorides there is an upper limit for the potassium chloride content above which the flux will not allow the molten filler rod to wet the metal. The upper limit is 65% in this system of salt mixtures. At least 25% potassium chloride should be used to avoid introducing a high lithium content which would otherwise become necessary to keep the melting point of the flux sufficiently low. About 30–45% potassium chloride is suitable and I have successfully used about 32–34% e. g., 33%, and also 36–39% e. g., 37.5%. Although I prefer to use potassium chloride I can partly replace this salt by one or more of the salts calcium, barium, and strontium chlorides, and potassium bromide. Fluxes within the scope of the present invention however contain at least 20% potassium chloride and the total of calcium, barium, strontium chlorides and potassium bromide for the purpose of the present invention is 10%.

Fluxes made in accordance with the present invention are also satisfactory as compared with the previously proposed fluxes as far as hygroscopicity, sensitivity to impurities, and cost, is concerned.

The following compositions of suitable fluxes within the scope of the present invention are quoted by way of example:

|  | Example 1, percentage | Example 2, percentage | Example 3, percentage | Example 4, percentage |
|---|---|---|---|---|
| Lithium chloride | 30 | 33 | 30 | 35 |
| Magnesium chloride | 12.5 | 14 | 8 | 12.5 |
| Calcium chloride | Nil | Nil | 4.5 | Nil |
| Potassium fluoride | 20.0 | 21.5 | 20.0 | 20 |
| Potassium chloride | 37.5 | 31.5 | 37.5 | 32.5 |

If the addition of sodium salts is not objectionable and if it is desired to lower the melting point of the flux, an addition of up to 5% of sodium chloride may be made and a flux of the following composition has been found satisfactory for welding Elektron AZM alloy:

Example 5

| | |
|---|---|
| Lithium chloride | 30 |
| Potassium fluoride | 17.5 |
| Potassium chloride | 40 |
| Magnesium chloride | 10 |
| Sodium chloride | 2.5 |

In view of the probability of reaction between the various salts during welding and the consequential possibility of replacement by equivalent salts the composition of the fluxes may be referred to by the percentage content of the various elements and on this basis the invention may be defined as a flux containing at least four salts comprising:

|  | Permissible range | Preferable range |
|---|---|---|
| Lithium | 3.4–11.7 | 4.1–6.7 |
| Magnesium | 0.7–6.4 | 2.4–3.7 |
| Sodium | 0–2.0 | 0–2.0 |
| Other metals | 0–6.6 | 0–2.6 |
| Fluorine | 4.5–13.2 | 5–11.6 |
| Chlorine | 29.2–62.6 | 42.6–58.9 |
| Potassium | 19.9–45.8 | 25.8–39.3 |

The compositions given herein exclude minor quantities of oxidic or other impurities and water and carbon dioxide which the flux may absorb from the atmosphere.

The term "welding" used herein and in the appended claims, is intended to include the fusion joining of metal by all forms of gas welding or electric welding or otherwise.

I claim:

1. A welding flux for welding magnesium and magnesium base alloys rich in manganese comprising a salt flux at least 78% of which consists of the following compounds in the percentages stated:

| | Per cent |
|---|---|
| LiCl | 21–58 |
| $MgCl_2$ | 3–25 |
| KF | 14–40 |
| KCl | 25–65 | these percentages being based upon the entire flux, the remainder of the flux being compatible with the foregoing ingredients and not deleteriously affecting same.

2. A welding flux for welding magnesium and magnesium base alloys rich in manganese comprising a salt flux at least 78% of which consists of the following compounds in the percentages stated:

| | Per cent |
|---|---|
| LiCl | 25–40 |
| $MgCl_2$ | 10–15 |
| KF | 15–35 |
| KCl | 30–40 | these percentages being based upon the entire flux, the remainder of the flux being compatible with the foregoing ingredients and not deleteriously affecting same.

3. A welding flux according to claim 1 in which said remainder of the flux includes from a substantial quantity of sodium salts up to 5% of the total composition.

CHARLES JAMES BUSHROD.